April 28, 1964 YOSHIO MURATA 3,130,631

PHOTOGRAPHIC IMAGE TRANSFERRING APPARATUS

Filed Aug. 23, 1960 3 Sheets-Sheet 1

INVENTOR.
YOSHIO MURATA
BY [signature]
AGENT

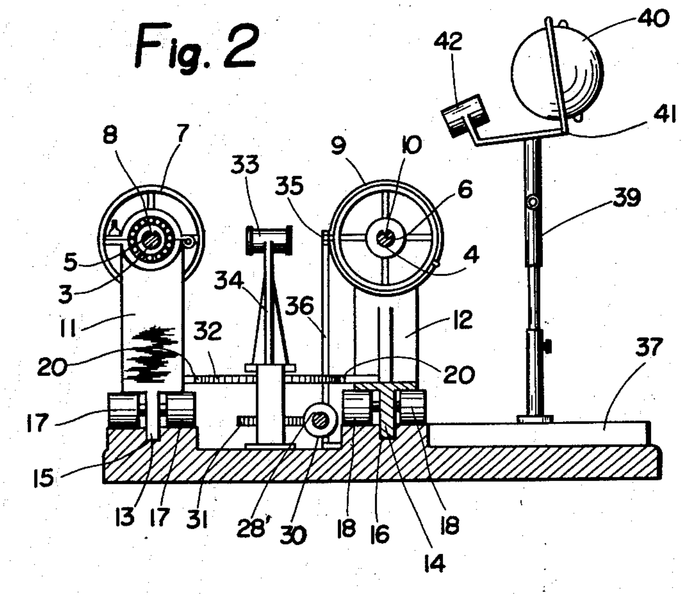
Fig. 4
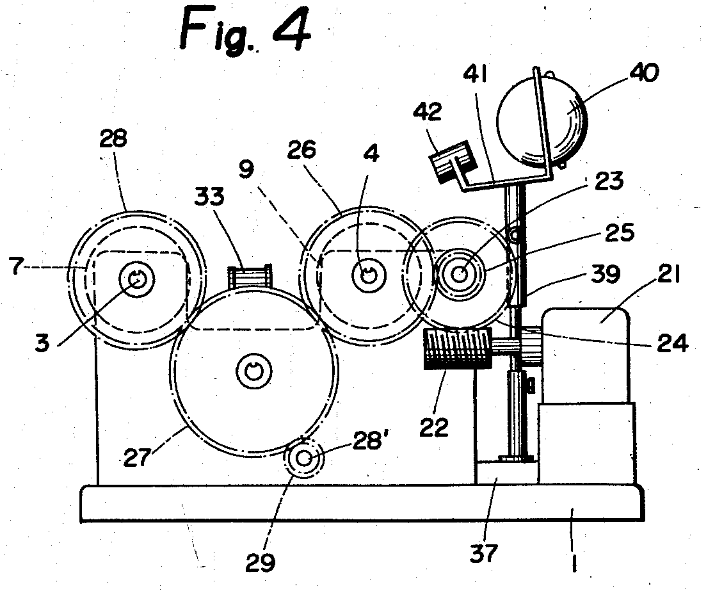
INVENTOR.
YOSHIO MURATA
BY [signature]
AGENT

April 28, 1964 YOSHIO MURATA 3,130,631

PHOTOGRAPHIC IMAGE TRANSFERRING APPARATUS

Filed Aug. 23, 1960 3 Sheets-Sheet 3

INVENTOR.
YOSHIO MURATA
BY [signature]
AGENT

United States Patent Office 3,130,631

Patented Apr. 28, 1964

3,130,631
PHOTOGRAPHIC IMAGE TRANSFERRING APPARATUS

Yoshio Murata, Nishinomiya, Japan, assignor to Osaka Denkai Kogyo Kabushiki Kaisha, Naniwa-ku, Osaka, Japan, a corporation Filed Aug. 23, 1960, Ser. No. 51,367
Claims priority, application Japan Nov. 23, 1959
3 Claims. (Cl. 88—24)

This invention relates to an optical transferring process, and more particularly to a process in which a manuscript block to be transferred and a photosensitive photographic block receiving the transferred image from the manuscript block are respectively carried on separate cylindrical body members, said two blocks being slidably opposed to each other, said both body members being rotated and simultaneously shifted in opposite directions, and the various data described on the manuscript block are printed onto the photosensitive photographic block without any juncture between the prints by means of a photographing lens which is located between said two blocks and by means of a light source arrangement which is available for said two blocks.

It is an object of my invention to provide a process wherein a manuscript block is printed on a photosensitive photographic block distinctly and efficiently by taking advantage of an optical apparatus.

It is a further object of my invention to provide a process wherein all kinds of manuscript blocks, including pattern blocks for textile printing, are to be held on a cylinder in cylindrical form, and at the same time, a photosensitive photographic block is caused to be carried on another cylinder, thereby said manuscript blocks are printed without any juncture between the prints.

Figure 1:
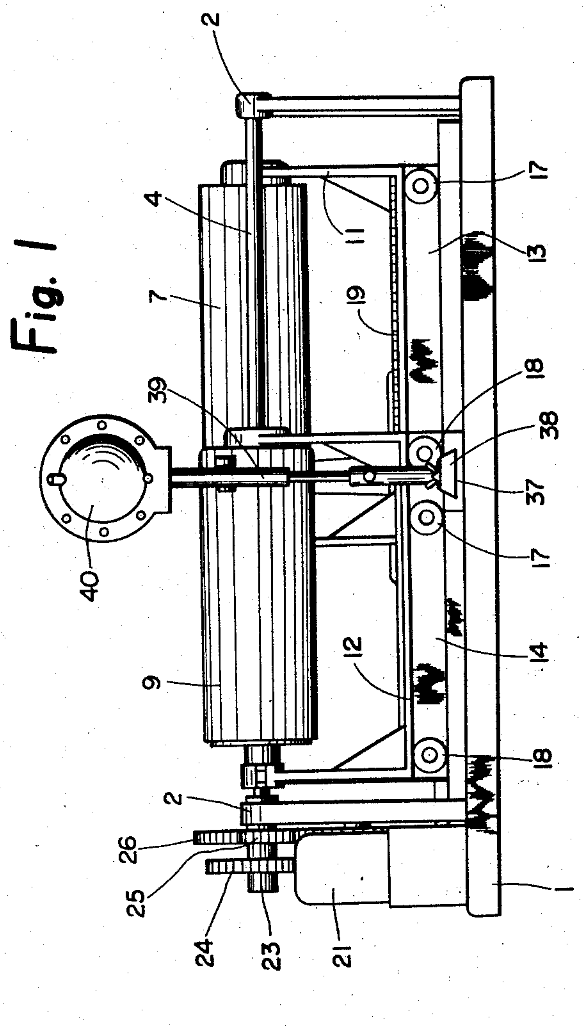
Figure 3:
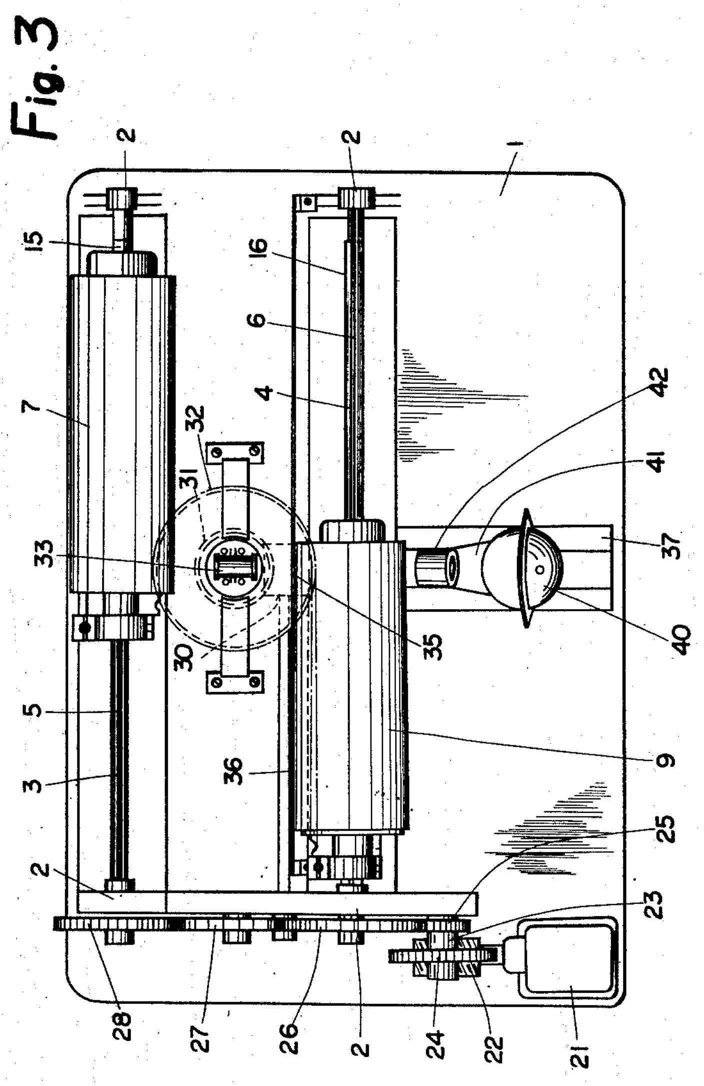

Other objects and advantages of the present invention will become apparent from the following description taken in connection with the accompanying drawings in which:

FIG. 1 is a front elevation of an apparatus showing an embodiment in accordance with the present invention, FIG. 2 is a side elevation illustrating the apparatus shown in FIG. 1 with certain elements in section, FIG. 3 is a plan view of the apparatus shown in FIG. 1, and, FIG. 4 is a schematic view of the side elevation showing the driving mechanism of the apparatus shown in FIG. 1.

For the purpose of explanation, the principles of the present invention are illustrated and described in connection with an embodiment of the type illustrated in the drawings.

Referring to the drawings, FIG. 1 to FIG. 4, the novel apparatus of the present invention comprises two pairs of bearings 2 which are mounted on machine base 1 and each of which carries rotating axis 3 or 4 respectively rotatable. Rotating axes 3 and 4 have longitudinal guide flutes 5 and 6 respectively and rotate in the respective bearings 2. Cylindrical member 7 adapted for holding a manuscript block or image carrier is mounted on rotating axis 3 slidably axially and rotatable around axis 3 by means of, such as, a head of key 8 which is fitting in longitudinal guide flute 5. Another cylindrical member 9 adapted for carrying a photosensitive photographic block or image receiving carrier is also mounted on rotating axis 4 slidably axially and rotatable around axis 4 by means of, such as, a head of a key 10 which is fitting in longitudinal guide flute 6. Both the manuscript block and the photosensitive photographic block are constructed so as to be rolled and mounted each onto the cylinder members in an easily attachable and detachable state. Both the ends of cylindrical members 7 and 9 are carried in carrier members 11 and 12 respectively, which have a spout shape in its section and provide rail pieces 13 and 14 respectively projected from the base plate of carrier members 11 and 12. Rail pieces 13 and 14 are fitted slidably and inserted into rail grooves 15 and 16 respectively and the movements of the carrier member are guided by means of guiding rollers 17 and 18 which are associated with carrier members 11 and 12 respectively. Guiding rollers 17 and 18 contact with and roll on the surfaces of rail grooves 15 and 16. Rack teeth members 19 and 20 are provided on each side surfaces of carrier members 11 and 12, said side surfaces facing each other.

The driving mechanism for rotating both cylindrical members 7 and 9 in opposite directions to each other and for shifting the same in the axial direction of the cylindrical members, is composed of electrical motor 21 which is mounted on machine base 1, worm 22 interlocked with electrical motor 21, worm wheel 24 mounted on accompanied axis 23 and engaged with worm 22, spur wheel 26 mounted on one end of rotating axis 4 and engaged with pinion 25 of worm wheel 24, intermediate spur wheel 27 engaged with spur wheels 26 and 28, spur wheel 28 mounted on the other end of rotating axis 3 and engaged with said intermediate spur wheel 27 so as to be rotated in the opposite directions of the rotation of spur wheel 26, spur wheel 29 having interlocking axis 28' provided with intermediate spur wheel 27, worm wheel 31 having worm 30 which is secured on interlocking axis 28', and spur wheel 32 which is engaged with both rack teeth members 19 and 20 so as to shift cylindrical members 7 and 9 in opposite directions.

Photographing lens member 33 to take a photograph of the pattern on the manuscript block is provided between cylindrical members 7 and 9 by means of carrier member 34 so that said lens member 33 is not rotated and shifted by the axial movements of the axes of cylindrical members 7 and 9 caused by the rotation of spur wheel 32. Light shielding tape 36 provided with rectangular slit 35 is located adjacent to cylindrical member 9 of the photosensitive photographic block between said lens member 33 and said cylindrical member 9. The light beam to be utilized in photographing the manuscript block and to be transmitted through photographing lens member 33 passes through rectangular slit 35 and arrives at the photosensitive photographic block. Light source 40 is located on the top of base lever 39, the height of said base lever 39 being adjusted freely by raising or lowering itself from the stem of base member 39. Foot member 38 of the stem of base member 39 is fitted into guide rail 37 provided on one side of machine base 1. Light beam collecting and projecting member 42 is provided in front of light source 40 on supporting arm 41 which is projecting from the housing of light source 40. Light beam collecting and projecting member 42 is made of a cylindrical lens and is constituted to collect and project the light beam from light source 40 to one spot on the manuscript block of cylindrical member 7 at the point that photographing lens member 33 is faced exactly with the one spot on the manuscript block. Above mentioned description is an embodiment of the mechanism to perform the method of the present invention and therefore it is well understood that any modified embodiment of the design of the invention belongs to the scope of the invention.

In operating the apparatus of the invention, the whole apparatus consituted in accordance with the above mentioned members is enclosed within a housing or a cover which is made of lightproof material so that the apparatus within the housing is prevented from being exposed to the light coming from the exterior of the housing. After winding a manuscript block to be photographed and a photosensitive photographic block to be exposed to the light coming from lens member 33 onto cylindrical members 7 and 9 respectively, electrical motor 21 is started. Spur wheel 26 is rotated by electrical motor 21 through worm 22, worm wheel 24 and pinion 25 used for retarding the rotating speed of electrical motor 21. Spur wheel 28 is also rotated by spur wheel 26 through intermediate spur wheel 27, therefore rotating axes 3 and 4 are rotated simultaneously in opposite directions. Rotating axes 3 and 4 start to rotate, and then both cylindrical members 7 and 9 are also start to rotate in the opposite direction with each other. Interlocking axis 28' is rotated by means of intermediate spur wheel 27 through spur wheel 29, and then spur wheel 32 is rotated by worm 30 of interlocking axis 28' through worm wheel 31. Carrier members 11 and 12 start to shift themselves in opposite directions on rotating axes 3 and 4 respectively by means of rack teeth members 19 and 20. As shown in FIG. 3, when the apparatus is started under the condition that cylindrical members 7 and 9 are so positioned that the beginning end of the manuscript block is faced to the terminating end of the photographic block, the manuscript block advances to the left in FIG. 3 and the photographic block advances to the right in FIG. 3. Both blocks advance while they are rotating. The light ray from light source 40 is projected onto the manuscript block through light beam collecting and projecting member 42, then the light ray is transmitted by means of photographing lens member 33 onto the photosensitive photographic block through rectangular slit 35 of light shielding tape 36. In accordance with the procedure described above, the rectangular part of the manuscript block to be photographed by rectangular slit 35 is successively projected onto the photosensitive photographic block in a spiral form and the photosensitive photographic block is exposed to the light passing through rectangular slit 35 came from the corresponding area on the manuscript block. In this manner, narrow strip parts of the manuscript block to be photographed through the rectangular slit are projected one after another without juncture onto the corresponding area of the photosensitive photographic part which becomes the opposite party of the manuscript block. After these operations have been performed, the photosensitive photographic block on which the details of the manuscript block were transferred and exposed is removed from cylindrical member 9 and utilized as an archetype of a matrix block and/or otherwise.

In summary, when the details on the manuscript block are to be transferred and printed onto the photosensitive photographic block utilizing an optical apparatus, the manuscript block and the photosensitive photographic block each carried on a cylindrical member respectively are rotated and simultaneously shifted in opposite directions with respect to the cylinder axes in the same degree, whereby the details on the whole surface of the manuscript block are transferred and printed onto the photosensitive photographic block in spiral form by means of the projected light passing through the rectangular slit. As a result, the efficiency of photographical transferring of the details on the manuscript is quite high, the junctures which usually occur between photographed prints in a conventional process are eliminated and blurring which was often generated between junctures in conventional apparatus is eliminated. Therefore, clear photographic transferring which has no blurring and no divergence over the whole area of the photographed print, can be obtained easily and exactly by utilizing successive shifting of the rectangular slit. However complicated the manuscript to be photographed may be, by utilizing the apparatus constituted in accordance with the present invention, the manuscript block can be simply transferred and photographed onto the photosensitive photographic block. The apparatus, described above, therefore, can be distinguished from the apparatus constituted by the prior arts and is superior in the fact that the design of the apparatus of the present application is relatively simple and the operation thereof is fully automatic and is not subject to error.

What I claim is:

1. A photographic image transferring apparatus comprising (*a*) two cylinder members having respective axes;
(*b*) an image carrier on one of said cylinder members;
(*c*) a sensitized image receiving carrier on the other one of said cylinder members;
(*d*) a source of light for projecting a beam of light on said image carrier for reflection therefrom;
(*e*) lens means interopsed between said cylinder members for transmitting the reflected beam from said image carrier to said image receiving carrier and
(*f*) actuating means for actuating simultaneous rotation of said cylinder members about the respective axes and simultaneous axial movement of said cylinder members relative to said reflected beam.

2. An apparatus as set forth in claim 1, wherein said axes of said cylinder members are substantially parallel and radially spaced from each other.

3. An apparatus as set forth in claim 2, wherein said actuating means include means for rotating said cylinders about the respective axes in opposite directions and for axially moving said cylinders in opposite directions.

References Cited in the file of this patent

UNITED STATES PATENTS

| | | |
|---|---|---|
| 1,844,162 | Hirsch et al. | Feb. 9, 1932 |
| 1,851,748 | Belin | Mar. 29, 1932 |
| 1,855,370 | Trenor | Apr. 26, 1932 |
| 1,968,287 | Farina | July 31, 1934 |
| 2,198,115 | John | Apr. 23, 1940 |
| 2,425,929 | Foster | Aug. 10, 1947 |
| 2,437,255 | Hogan et al. | Mar. 9, 1948 |
| 2,554,507 | Smith | May 29, 1951 |
| 3,066,572 | Von Bubna-Littitz | Dec. 4, 1962 |